United States Patent [19]

Aller et al.

[11] 4,257,542

[45] Mar. 24, 1981

[54] SLIDE GATE FOR CONTAINERS HOLDING LIQUID METAL MELT

[75] Inventors: Walther Aller, Vielbach; Eckehard Eisermann, Grefrath; Dieter Vahlhaus, Mulheim an der Ruhr; Gerd König, Neukirchen-Vluyn, all of Fed. Rep. of Germany

[73] Assignee: Martin & Pagenstecher GmbH, Cologne-Mülheim, Fed. Rep. of Germany

[21] Appl. No.: 882,487

[22] Filed: Mar. 1, 1978

[30] Foreign Application Priority Data

Mar. 4, 1977 [DE] Fed. Rep. of Germany ....... 2709462

[51] Int. Cl.³ .................... B22D 41/08; B22D 45/00
[52] U.S. Cl. .................................. 222/600; 427/294
[58] Field of Search ............... 427/294, 385 C, 430 B, 427/443; 222/600, 591; 208/22

[56] References Cited

U.S. PATENT DOCUMENTS

| 1,965,646 | 7/1934 | Ihrig | 427/385 C |
| 3,004,862 | 10/1961 | Winston | 208/22 X |
| 3,970,283 | 7/1976 | Hind | 222/600 X |
| 4,009,308 | 2/1977 | Tadashi et al. | 427/294 X |

FOREIGN PATENT DOCUMENTS

| 2107127 | 8/1972 | Fed. Rep. of Germany | 222/600 |
| 48-25049 | 10/1974 | Japan | 427/385 C |

OTHER PUBLICATIONS

Carvlin, Jr., "Pressure Treatment Up-Grades Teeming Ladle Nozzles", *The Iron Age*, Feb. 25, 1960, pp. 68-70.

Primary Examiner—David A. Scherbel
Attorney, Agent, or Firm—Sprung, Felfe, Horn, Lynch & Kramer

[57] ABSTRACT

An improvement in a slide gate for a container holding molten metal comprising a slide housing and refractory bodies made of a refractory composition, which refractory bodies have been impregnated with carbon-containing media, the improvement residing in employing as the carbon-containing medium an oil containing less than 10% by weight pitch.

6 Claims, 1 Drawing Figure

U.S. Patent     Mar. 24, 1981     4,257,542
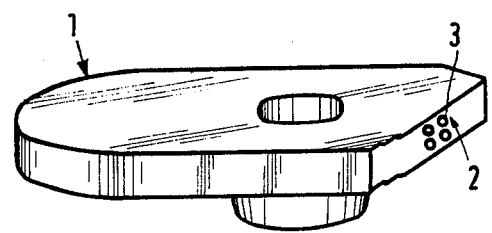

SLIDE GATE FOR CONTAINERS HOLDING LIQUID METAL MELT

BACKGROUND OF THE INVENTION

1. Field of the Invention

This invention relates to a slide gate mechanism for a container employed to hold molten metal. More specially, this invention relates to such a slide gate mechanism comprising refractory bodies which have been impregnated with carbon containing media, especially, in accordance with the invention, an oil containing less than 10% by weight pitch.

2. Discussion of the Prior Art

Slide gate mechanisms for use in connection with vessels containing molten metal are heretofore known and have been used in the Steel Industry in ladles and the like. These slide gates are composed of a metallic housing or framework and refractory bodies. The refractory bodies which come in direct contact with molten metal contained within the container consist essentially of a head (top) plate, stationary arranged in the metallic housing, and a slide plate (slide gate) with a collector nozzle slideable in said metallic housing against said head plate. The slide gate mechanism itself has proved itself useful in steel casting, in particular, in vacuum treatment and continuous casting.

The requirements for the refractory bodies of the slide gate have increased owing to increases in the size of ladles employed and a lengthening of the casting times. It is obvious that the head and slide plate which come in contact with the molten metal can undergo some degradation owing to the high temperatures at which it is employed. It is particularly desirable to provide plates which can be used repeatedly i.e., which are resistant to the aggressive influences of the molten metal to which they come in contact.

It has been proposed to provide plates with a carbon-containing material. Thus, it has already been proposed to impregnate converter bricks, torpedo ladle bricks, blast furnace bricks, or the like with some carbon-containing material whereby the pore volume of the body made of the refractory material (said pore volume being about 15% by volume of the body) contain tar containing 60 to 90% by weight pitch. The use of this high pitch containing tar leads to a carbon content of the refractory bodies (brick) of about 5% by weight. It has been suggested that this high carbon content prevents infiltration of slags and steel and thereby decreases the rate of degradation and abrasion of the plates.

The aforesaid described procedure has also been used for the refractory bodies of slide gates. Thus, according to German Offenlegungsschrift No. 2,107,127 it has been proposed to impregnate the plates of magnesite with carbon-containing material. The following positive influences on the abrasion behaviour are substantially attributed to this tar impregnation:

1. Reduction in slag and steel infiltration.
2. Improvement in the locking and sliding behaviour by surface evaporating tar components.
3. Improvement in the resistance to sudden changes in temperature of the ceramic material.

However, according to this technique, considerable tar quantities evaporate upon use at the ladle and condensation of the same occurs in the slider housing on springs, cooling channels and upon other mechanical parts. Hence, it has become necessary to remove the slide gate after only a few castings and to thoroughly cleanse the same. This removal and cleansing operation entails a considerable amount of work with possible lowering of production.

It has also heretofore been proposed to subject the plates to a temperature treatment between 300° and 600° C. before the same are used in order to avoid the evaporation of tar upon use of the slide gate and the deposition of quantities of condensated material upon the mechanical parts. The high initial tar discharge is avoided vis-a-vis the non-tempered impregnated plates. However, by such a thermal treatment the life of the slide gates themselves is reduced.

Accordingly, it is an object of the present invention to provide refractory bodies for a slide gate mechanism characterized by a long working life and a low degree of contamination of related mechanical parts upon use. It is a particularly desirable object of the present invention to provide a slide mechanism for a sliding gate which can be repeatedly used without contamination of mechanical parts and substantial impairment of their mechanical features owing to deposition of tar and the like thereon.

SUMMARY OF THE INVENTION

Broadly, this invention contemplates an improvement in a slide gate for a container for holding molten metal comprising a slide housing and refractory bodies made of a refractory composition which refractory bodies have been impregnated with carbon-containing media. According to the invention the carbon-containing medium is an oil, containing less than 10% by weight of pitch. Preferably, in accordance with the invention, there is employed an oil containing less than 3% by weight pitch.

Due to the extremely low pitch content, it has been found that oils of the type described produce virtually no carbon separation. In a particular desirable embodiment of the invention, the pore volume of the refractory bodies of the slide gate are impregnated with 5 to 20 volume % of oil, preferably 12 to 18 volume % of oil, based upon 100% volume of refractory composition determined by the shape of the refractory body, i.e. the volume of the refractory composition plus the pore volume within the body-shaped refractory composition.

Impregnation of the refractory bodies can be effected, in accordance with this invention, by subjecting the bodies to sub-atmospheric pressure impregnation, i.e. performing the impregnation at a pressure of less than 1 atmosphere, typically, 0.08 to 0.40 bar, preferably 0.08 to 0.16 bar. The impregnation of the refractory bodies is typically effected at a temperature between 100° and 300° C. in order to facilitate the penetration of the impregnating oil into the pores of the refractory bodies of the slider. The step of sub-pressure impregnation of the refractory bodies is, in and of itself, known.

The usual refractory masses are suitable for the refractory bodies of the slider itself. The refractory masses having a high alumina content are preferred. Thus, without considering the volume percentage of the impregnating oil which fills up pore volume of the refractory bodies upon impregnation, it is preferred that the refractory portion of the refractory bodies contain between 80 and 95% by weight of $Al_2O_3$ per 100% by weight of refractory composition. The remainder of the refractory mass can be provided by $SiO_2$. Thus, the following composition is, for example, a particularily favourable composition for the refractory mass of the refractory bodies employed on the slider:
- 80 to 95% by weight of $Al_2O_3$
- 4.5 to 18.5% by weight of $SiO_2$
- 0 to 0.5% by weight of $Fe_2O_3$
- 0 to 0.3% by weight of $Na_2O$.

The lower limit for $Fe_2O_3$ is preferably 0.2% by weight and for $Na_2O$ preferably 0.05% by weight.

The granulation of the refractory mass lies, desirably, between 0 and 1.2 mm. It is preferred that 30 to 50% by weight of the granular refractory composition have a particle size below 0.1 mm.

It is important in accordance with the invention that an oil having a low carbon content or providing a low carbon residue be employed. The coking residue according to CONRADSON can be determined in order to select a suitable impregnation oil. The provision for the test originating from CONRADSON are known to one of skill in the art such as by the international test known as Deutsche Industrie Norm 51 551. The coking residue of the selected oil should amount to less than 5% by weight, preferably less than 2% by weight. It is guaranteed that with such impregnating oils that upon use of the plates the carbon content will not exceed 0.5% by weight in the impregnated refractory portion. It is preferred that the carbon content of such impregnated refractory composition remains below 0.3% by weight.

Considering the foregoing parameters, tar distillates which are known for use in impregnating oil for building and wood protection purposes are especially useful in accordance with this invention. Such are described, for instance, in ULLMANNS "Enzyklopädie der technischen Chemie", 3rd edition (1965), vol. 16, page 689, the disclosure of which is hereby incorporated herein by reference.

It is considered particularly suprising that the use of a low pitch containing oil is effective in providing plates which can be repeatedly used in a slide gate where the plates come in contact with a molten metal, since the prior teaching have advocated the use of an impregnating tar having a high pitch content. In fact, a high pitch-containing tar has been heretofore regarded as an essential component for providing cabon-containing media in the refractory composition of slide plates. The low pitch-containing oils used in accordance with the present invention are characterized with virtually no coking residue and yet lead to long working lives for the refractory bodies. As the carbon content or coking residue, previously regarded as essential, are not present in the present invention, other factors contribute to the augmented working life of the refractory bodies. While not wishing to be bound by any theory, it is believed that the augmented working life is due to the fact that the impregnant used in accordance with the present invention is continuously evaporated to form a protective film against the liquid metal components, e.g., steel or slag and thereby prevents aggressive attack.

In addition to the long working life, it has been observed that casters in connection with the sliding gate assembly are less contaminated by dirty carbon smoke plume since by the use of the named impregnants only a light white-coloured plume is given off during use. Evaporation, therefore, no longer produces a disturbing carbon separation or a high polymeric type decomposition product. Continual cleaning of the refractory bodies is therefore unnecessary, representing a significant commercial advantage.

BRIEF DESCRIPTION OF DRAWINGS

An embodiment of a plate in accordance with the present invention is shown in the accompanying FIGURE.

DESCRIPTION OF SPECIFIC EMBODIMENT

In accordance with the drawings there is shown a plate 1, composed of a refractory material of high alumina content 2. The plate 1 is impregnated with an impregnating oil 3. Impregnation is carried out in vacuum so that the open pore volume of the refractory composition is virtually completely filled with impregnating oil.

In order to more fully illustrate the nature of the invention and the manner of practicing the same, the following example and comparative example are set forth.

EXAMPLES

A plate was impregnated in accordance with test A with a tar composition employed by the prior art. Additionally, the same plate was impregnated with a low pitch containing oil in accordance with the present invention, the resultant plate being designated as test. In each case the plate was made of a refractory composition having the following components:
- 92% by weight of $Al_2O_3$
- 7.5% by weight of $SiO_2$
- 0.4% by weight of $Fe_2O_3$
- 0.1% by weight of $Na_2O$.

The granulation amounted to a maximum of 1.2 mm with 45% by weight of the particles having a size below 0.1 mm. The pore volume of the refractory body (plate) in each case was impregnated by a vacuum impregnation step so that on the basis of 100% by volume given by the shape of the refractory body additionally 13% by volume of oil were introduced (impregnation) into the pores of the refractory body. The finished impregnated bodies were subjected to temperature of 400° C. for 6 hours in order to observe any carbon separation.

Tests showed that a considerable carbon separation is observed employing a slider according to the prior art. In contrast thereto virtually no carbon separation is observed using a slider according to the invention.

Carbon separations are observed in actual use. Considerable tar vapors arise during operations with prior art sliders. In the case of the prior art slider, the slider housing has to be cleaned thoroughly every fifth charge. In contrast thereto, there is no apparent contamination using a slider according to the invention. Sliders according to the invention are cleaned, only as a precautionary measure, after every 80 or so charges. At this point the prior art sliders have already been cleaned approximately 16 times. A slider according to the invention is still useable even after a test series of 100 charges.

What is claimed is:

1. In a slide gate for a container for holding molten metal comprising a slide housing and refractory bodies made of a refractory composition which refractory bodies have been impregnated with a carbon-containing medium, the improvement wherein said refractory body is impregnated with an impregnant consisting essentially of oil which oil is a carbon-containing medium and contains less than 10% by weight pitch.

2. A gate according to claim 1, wherein said refractory bodies are impregnated with 5 to 20 volume percent oil.

3. A gate according to claim 2, wherein said refractory composition of said refractory bodies is comprised of 80 to 95% by weight $Al_2O_3$, based upon 100% by weight of the refractory composition free of said oil.

4. A gate according to claim 3, wherein said refractory composition of said refractory bodies comprises
80 to 95% by weight of $Al_2O_3$
4.5 to 18.5% by weight of $SiO_2$
0 to 0.5% by weight of $Fe_2O_3$
0 to 0.3% by weight of $Na_2O$
based upon 100% by weight of said refractory composition free of said oil.

5. A gate according to claim 1, where said oil has a coking residue according to Conradson of less than 5% by weight.

6. A gate according to claim 1, wherein said oil has a coking residue according to Conradson of less than 2% by weight.

* * * * *